(12) United States Patent
Honma et al.

(10) Patent No.: US 7,356,400 B2
(45) Date of Patent: Apr. 8, 2008

(54) CLUTCH CONTROL APPARATUS AND METHOD

(75) Inventors: Tomoaki Honma, Kanagawa (JP);
Masaaki Uchida, Kanagawa (JP);
Shusaku Katakura, Kanagawa (JP);
Yoshinobu Kawamoto, Kanagawa (JP)

(73) Assignee: JATCO Ltd, Shizuoka (JP)

( * ) Notice: Subject to any disclaimer, the term of this patent is extended or adjusted under 35 U.S.C. 154(b) by 206 days.

(21) Appl. No.: 11/362,206

(22) Filed: Feb. 27, 2006

(65) Prior Publication Data

US 2006/0212204 A1    Sep. 21, 2006

(30) Foreign Application Priority Data

Mar. 9, 2005    (JP) .............................. 2005-066110
Jun. 3, 2005    (JP) .............................. 2005-164568

(51) Int. Cl.
G06F 19/00 (2006.01)

(52) U.S. Cl. .......................... 701/67; 477/39; 477/70; 477/175; 477/176

(58) Field of Classification Search ................. 701/51, 701/67; 477/39, 70, 80, 166, 175, 176
See application file for complete search history.

(56) References Cited

U.S. PATENT DOCUMENTS

| | | | | |
|---|---|---|---|---|
| 5,314,050 A | * | 5/1994 | Slicker et al. | 477/171 |
| 5,403,249 A | * | 4/1995 | Slicker | 477/176 |
| 5,630,773 A | * | 5/1997 | Slicker et al. | 477/176 |
| 5,766,110 A | | 6/1998 | Kanno et al. | |
| 5,993,355 A | * | 11/1999 | Nordg.ang.rd | 477/174 |
| 6,402,659 B1 | * | 6/2002 | Inoue | 477/39 |
| 7,037,239 B2 | * | 5/2006 | Werner et al. | 477/176 |
| 2004/0210374 A1 | * | 10/2004 | Werner et al. | 701/67 |

FOREIGN PATENT DOCUMENTS

| | | |
|---|---|---|
| JP | 62-004950 A | 1/1987 |
| JP | 09-072353 A | 3/1997 |

* cited by examiner

*Primary Examiner*—Gary Chin
(74) *Attorney, Agent, or Firm*—Foley & Lardner LLP (57) ABSTRACT

A clutch control apparatus for a power transmission system including an input rotating member and an output rotating member. The clutch control apparatus includes a friction clutch, and a control unit. The control unit sets a first desired clutch torque setting in accordance with a clutch slip indicator; sets a second desired clutch torque setting to an amount of torque input from the input rotating member to the friction clutch; controls the clutch torque to be the first desired clutch torque setting during a starting stage of the friction clutch; controls the clutch torque to be the second desired clutch torque setting during a steady-state stage of the friction clutch; and controls the clutch torque to gradually change from the first desired clutch torque setting to the second desired clutch torque setting during a transition stage between the starting stage and the steady-state stage.

13 Claims, 4 Drawing Sheets

CLUTCH CONTROL APPARATUS AND METHOD

BACKGROUND OF THE INVENTION

The present invention relates to clutch control apparatus and method for controlling a torque transmitted between an input rotating member and an output rotating member of a power transmission system.

Conventionally, there is known a clutch control technique for automotive vehicle, which controls the magnitude of a torque transmitted from an engine to a drive wheel by automatically engaging and disengaging a clutch during vehicle starting or running. A Published Japanese Patent Application No. H9-72353 (hereinafter referred to as "JP9-72353") shows a clutch control technique that derives a clutch torque capacity coefficient in accordance with a clutch speed ratio defined as a ratio of the rotational speed of a driven-side rotating member to the rotational speed of a driving-side rotating member, using a predetermined map defining a relationship between the clutch speed ratio and the clutch torque capacity coefficient, computes a desired torque capacity in accordance with the clutch torque capacity coefficient and an engine speed, and automatically controls the clutch torque capacity in accordance with the desired clutch torque capacity by regulating the hydraulic pressure of a clutch piston to adjust the engagement pressure of the clutch. In JP9-72353, three different maps concerning clutch the torque capacity coefficient are prepared and selected in accordance with a throttle opening. In each of the maps, the clutch torque capacity coefficient is set to a minimum value when the clutch speed ratio is identical to 1.0 indicating a fully engaged state of the clutch. Specifically, each of the maps is defined in such a manner that as the clutch speed ratio increases or decreases from 1.0, to increase the amount of slip of the clutch, the clutch torque capacity coefficient increases. For example, during vehicle starting, the clutch torque capacity is set to increase with an increase in the clutch slip speed, and the clutch engagement pressure is automatically controlled, to promote the clutch speed ratio to change toward 1.0. On the other hand, during vehicle steady-state driving where the clutch is fully engaged, the clutch torque capacity coefficient is set to be smaller, and the clutch torque capacity is computed to be small accordingly, so that the clutch engagement pressure is comparatively small. As a result, the torque transmitted through the clutch does not increase excessively large, and a potential engagement shock in engaging the clutch is reduced.

In the above-mentioned torque capacity control, the clutch torque capacity coefficient is set to be higher to some extent than the actual value of the torque transmitted from the driving side to the driven side, when the clutch speed ratio is 1.0. That is, the clutch is controlled to be in a state where the driven side and the driving side are engaged by an engagement pressure higher than an actually required engagement pressure, to ensure full torque transmission.

SUMMARY OF THE INVENTION

In the above conventional torque capacity control, the clutch is fully engaged during vehicle steady-state driving or usual driving conditions. When the clutch speed ratio is 1.0, the clutch torque capacity is set to be larger than the torque actually transmitted from the driving side to the driven side in order to ensure full torque transmission. During the clutch being fully engaged, there arises no difference in rotational speed between the driving side and the driven side. Accordingly, a static frictional force larger than a dynamic frictional force is acting between the clutch engaging members.

On the other hand, in recent years, there is proposed a technique of controlling the engagement pressure to be identical to an actually required engagement pressure, during conditions where the clutch is conventionally fully engaged. That is, during vehicle steady-state driving, the clutch is automatically controlled to balance the clutch capacity with a torque input from the driving side, so that a slip state infinitely close to the fully engaged state (or an engaged state infinitely close to a slip state) is formed. The above technique of avoiding full engagement of the clutch during vehicle starting intends to realize a condition where static frictional force is not acting between the driving and driven sides with the clutch being in the engaged state, to enhance controllability of the clutch with securing the efficiency of torque transmission.

However, if the control mode of the above-mentioned conventional technique based on full engagement of clutch is followed by a mode of called a clutch slip control where the torque capacity is controlled and the amount of slip between the driving and driven sides is controlled and held at a predetermined speed during vehicle starting, it is difficult to smoothly shift the control modes, so that it is possible that a torque shock occurs to adversely affect driving feeling of vehicle operation. In addition, in the conventional torque capacity control, the clutch torque capacity is set in accordance with the clutch speed ratio, it is possible that the amount of slip is not directly controlled as desired. For example, when a predetermined amount of slip rotation is to be produced between driving and driven sides, the clutch torque capacity is controlled to change the ratio in rotational speed between the driving and driven sides. Accordingly, it is possible that a fixed clutch slip speed is not held in the conventional technique. Thus, it is possible that the conventional torque capacity control technique cannot control the amount of slip of a clutch arbitrarily in accordance with the clutch torque capacity.

Accordingly, it is an object of the present invention to provide a clutch control apparatus and a clutch control method to enhance controllability of a clutch in a process including a shift between a slip control mode and a steady-state control mode based on an input torque.

According to one aspect of the present invention, a clutch control apparatus for a power transmission system including an input rotating member and an output rotating member, comprises: a friction clutch adapted to couple the input rotating member and the output rotating member with a variable degree of engagement, to transmit a clutch torque from the input rotating member to the output rotating member; a clutch actuator arranged to regulate the degree of engagement of the friction clutch to control the clutch torque; and a control unit connected for signal communication to the clutch actuator, and configured to perform the following: setting a first desired clutch torque setting in accordance with a clutch slip indicator indicative of an amount of slip between the input rotating member and the output rotating member; setting a second desired clutch torque setting to an amount of torque input from the input rotating member to the friction clutch; controlling the clutch torque to be the first desired clutch torque setting during a starting stage of the friction clutch; controlling the clutch torque to be the second desired clutch torque setting during a steady-state stage of the friction clutch; and controlling the clutch torque to gradually change from the first desired clutch torque setting to the second desired clutch torque setting during a transition stage between the starting stage and the steady-state stage.

According to another aspect of the invention, a clutch control apparatus for a power transmission system including an input rotating member and an output rotating member, comprises: friction means for coupling the input rotating member and the output rotating member with a variable degree of engagement, to transmit a clutch torque from the input rotating member to the output rotating member; actuating means for regulating the degree of engagement of the friction means to control the clutch torque; and control means for performing the following: setting a first desired clutch torque setting in accordance with a clutch slip indicator indicative of an amount of slip between the input rotating member and the output rotating member; setting a second desired clutch torque setting to an amount of torque input from the input rotating member to the friction means; controlling the clutch torque to be the first desired clutch torque setting during a starting stage of the friction means; controlling the clutch torque to be the second desired clutch torque setting during a steady-state stage of the friction means; and controlling the clutch torque to gradually change from the first desired clutch torque setting to the second desired clutch torque setting during a transition stage between the starting stage and the steady-state stage.

According to a further aspect of the invention, a clutch control method of controlling a power transmission system including an input rotating member, an output rotating member, a friction clutch adapted to couple the input rotating member and the output rotating member with a variable degree of engagement, to transmit a clutch torque from the input rotating member to the output rotating member, and a clutch actuator arranged to regulate the degree of engagement of the friction clutch to control the clutch torque, comprises: setting a first desired clutch torque setting in accordance with a clutch slip indicator indicative of an amount of slip between the input rotating member and the output rotating member; setting a second desired clutch torque setting to an amount of torque input from the input rotating member to the friction clutch; controlling the clutch torque to be the first desired clutch torque setting during a starting stage of the friction clutch; controlling the clutch torque to be the second desired clutch torque setting during a steady-state stage of the friction clutch; and controlling the clutch torque to gradually change from the first desired clutch torque setting to the second desired clutch torque setting during a transition stage between the starting stage and the steady-state stage.

DETAILED DESCRIPTION OF THE INVENTION

Figure 1:
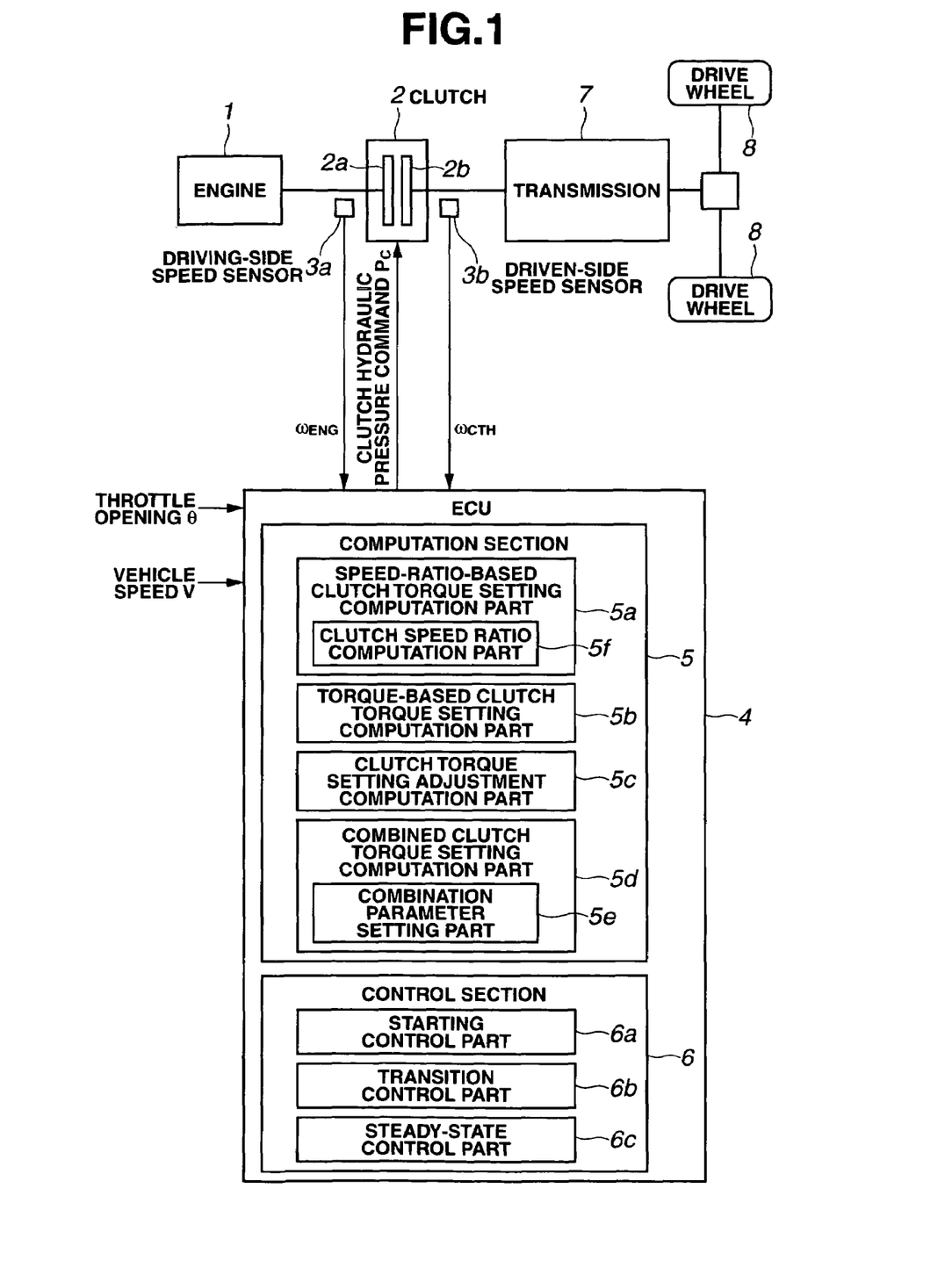
FIG. 1 is a schematic block diagram showing a power transmission system of an automotive vehicle with a clutch control apparatus in accordance with an embodiment of the present invention.

Referring now to FIG. 1, there is shown a configuration of a clutch control apparatus in accordance with an embodiment of the present invention. FIG. 1 is a schematic block diagram showing a power transmission system of an automotive vehicle with a clutch control apparatus in accordance with an embodiment of the present invention. In this power transmission system, a driving torque output from an engine 1 is transmitted to drive wheels 8, 8 via a transmission 7. On the driveline connecting engine 1 and drive wheels 8, 8, specifically, between engine 1 and transmission 7, a multi-plate wet clutch 2 is provided as a friction clutch. Clutch 2 includes a driving engaging member 2a such as a driving clutch plate arranged to rotate by the driving torque of engine 1, and a driven engaging member 2b such as a driven clutch plate disposed in parallel to driving engaging member 2a. Specifically, clutch 2 includes a friction clutch adapted to couple the input rotating member and the output rotating member with a variable degree of engagement, to transmit a clutch torque from the input rotating member to the output rotating member, and a clutch actuator arranged to regulate the degree of engagement of the friction clutch to control the clutch torque. The clutch actuator is arranged to generate a clutch engagement pressure of clutch 2 to control the clutch torque. The driving torque from engine 1 is connected or disconnected by connecting or disconnecting driving engaging member 2a and driven engaging member 2b, namely, by controlling clutch 2 to an engaged state or to a disengaged state. The engagement and disengagement of driving engaging member 2a and driven engaging member 2b are controlled by an electrical control unit (ECU) 4 as a controller. A driving-side rotational speed sensor (engine rotational speed sensor) 3a is disposed upstream of clutch 2 in the driveline and arranged to measure rotational speed $\omega_{ENG}$ of driving engaging member 2a. A driven-side speed sensor 3b is disposed downstream of clutch 2 in the driveline, and arranged to measure rotational speed $\omega_{CTH}$ of driven engaging member 2b. Each of measured rotational speed $\omega_{ENG}$ and $\omega_{CTH}$ is input into ECU 4.

ECU 4 receives sensor data, such as rotational speeds $\omega_{ENG}$ and $\omega_{CTH}$ input from driving side rotational speed sensor 3a and driven side rotational speed sensor 3b, a throttle opening θ input from a throttle position sensor, a vehicle speed V input from a vehicle speed sensor, and an engine speed Ne (equivalent to rotational speed $\omega_{ENG}$), computes a desired degree of engagement of driving engaging member 2a and driven engaging member 2b based on the sensor data, and outputs a clutch hydraulic pressure command to control or regulate clutch 2 in accordance with the desired degree of engagement. ECU 4 employs three control modes including a starting control mode of controlling clutch 2 during vehicle starting from standstill, a steady-state control mode of controlling clutch 2 during vehicle steady-state driving, and a transition control mode between the starting control mode and the steady-state control mode. In the starting control mode, clutch 2 is controlled in accordance with the clutch speed ratio of clutch 2. On the other hand, in the steady-state control mode, clutch 2 is controlled in accordance with the magnitude of the torque input from engine 1 into clutch 2. The transition control mode is employed to smoothly switch from the starting control mode to the steady-state control mode.

The following describes specific functions of ECU 4. ECU 4 includes a computation section 5 for computing various clutch torque settings concerning the control of clutch 2, and a control section (clutch engagement control section) 6 for controlling clutch 2 in accordance with the various clutch torque settings computed in computation section 5. Computation section 5 includes a speed-ratio-based clutch torque setting computation part 5a, a torque-based clutch torque setting computation part 5b, a clutch torque setting adjustment computation part 5c, and a combined clutch torque setting computation part 5d. Control section 6 includes a starting control part 6a, a transition control part 6b, and a steady-state control part 6c.

Speed-ratio-based clutch torque setting computation part 5a is configured to compute an amount of the clutch torque capacity of clutch 2 concerning the starting control. Specifically, clutch slip speed (clutch difference speed) $\omega_{SL}$ is first computed based on rotational speed $\omega_{ENG}$ and $\omega_{CTH}$ using the following equation (1), where clutch slip speed $\omega_{SL}$ is defined as an amount of slip of clutch 2 with respect to the input rotational speed.

$$\omega_{SL} = \omega_{ENG} - \omega_{CTH} \quad (1)$$

On the other hand, speed-ratio-based clutch torque setting computation part 5a includes a clutch speed ratio computation part 5f for computing a ratio in rotational speed between driving engaging member 2a and driven engaging member 2b. Clutch speed ratio computation part 5f is configured to compute clutch speed ratio e defined as a ratio between rotational speeds $\omega_{ENG}$ and $\omega_{CTH}$ using the following equation (2)

$$e = \omega_{CTH} / \omega_{ENG} \quad (2)$$

Figure 4:
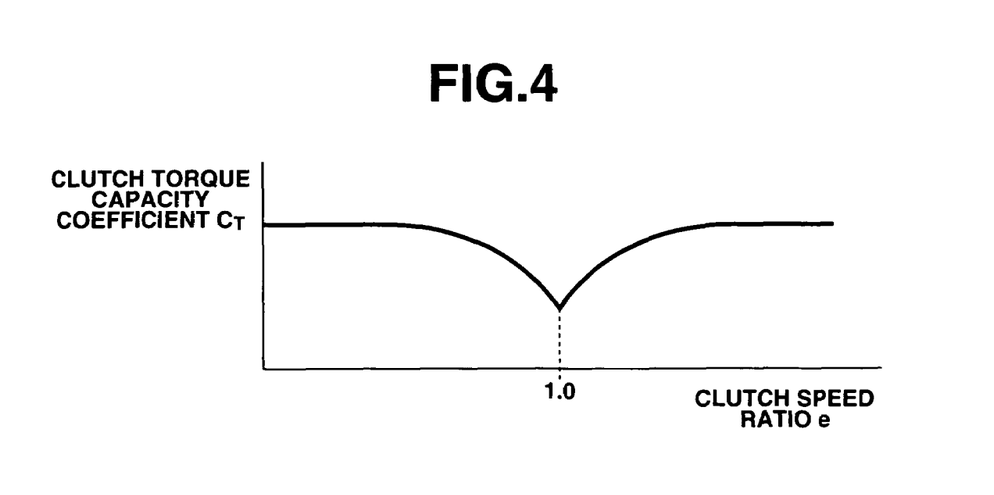
FIG. 4 is a graph showing a relationship between a clutch speed ratio and a clutch torque capacity coefficient in a starting control mode of the clutch control apparatus of FIG. 1.

Thus, speed-ratio-based clutch torque setting computation part 5a first sets a clutch slip indicator indicative of an amount of slip between the input rotating member and the output rotating member. Further, speed-ratio-based clutch torque setting computation part 5a is configured to compute a first desired clutch torque setting (a desired clutch torque capacity of clutch 2 as a control setpoint) $T_{ST}$, based on clutch speed ratio e computed by clutch speed ratio computation part 5f, using a predetermined characteristic map. Specifically, speed-ratio-based clutch torque setting computation part 5a determines the clutch torque capacity coefficient $C_T$ using a characteristic map as shown in FIG. 4, and computes the torque capacity of clutch 2 based on clutch torque capacity coefficient $C_T$, and engine rotational speed Ne, as first desired clutch torque setting $T_{ST}$. The characteristic map defining the relationship between clutch torque capacity coefficient $C_T$ and clutch speed ratio e are arbitrarily predetermined in accordance with a desired characteristic for clutch 2. In this embodiment, the characteristic map is determined as shown in FIG. 4 so that when clutch speed ratio e is 1.0, clutch torque capacity coefficient $C_T$ takes the minimum value. Clutch torque capacity coefficient $C_T$ increases with an increase in deviation of clutch speed ratio e with respect to 1.0, that is, with an increase in clutch speed ratio e from 1.0 or with an decrease in clutch speed ratio e from 1.0. In addition, the relationship between clutch speed ratio e and clutch torque capacity coefficient $C_T$ are defined so that the rate of change (increase) in clutch torque capacity coefficient $C_T$ decreases with an increase in deviation of clutch speed ratio e with respect to 1.0. e=1.0 indicates a state where the rotational speed of driving engaging member 2a is identical to the rotational speed of driven engaging member 2b. As the amount of slip between these engaging members increases, the computed value of clutch speed ratio e deviates from 1.0. The above setting realizes torque-converter-like clutch operation. That is, since the torque capacity of clutch 2 is set large during vehicle starting, the engagement pressure of clutch 2 is smoothly and automatically controlled so that clutch speed ratio e may approach 1.0. Since the torque capacity of clutch 2 is set to decrease as clutch speed ratio e approaches 1.0, it is easy to allow clutch 2 slip in response to depressing or releasing operation of the accelerator, to reduce a torque shock due to comparatively rough accelerator operation.

On the other hand, torque-based clutch torque setting computation part 5b serves for computing the clutch torque capacity for the steady-state control, and is configured to compute a second desired clutch torque setting $T_{IN}$ concerning the steady-state control. Second desired clutch torque setting $T_{IN}$ is set to the magnitude of a torque input from engine 1 to driving engaging member 2a of clutch 2, so that clutch 2 is brought to be in a steady-state engaged state where the torque input from the driving side is fully transmitted to the driven side without excess or shortage. Thus, the torque capacity of clutch 2 is computed to be equal to an actually required engagement pressure, using the method of the steady-state control which controls the engagement pressure at the time of clutch full engagement, and defined as second desired clutch torque setting $T_{IN}$.

Clutch torque capacity adjustment computation part 5c also serves for computing the clutch torque capacity for the steady-state control, and is configured to compute a clutch slip torque $T_{SL}$ required to produce a predetermined desired amount of slip between driving engaging member 2a and driven engaging member 2b. Clutch slip torque $T_{SL}$ is computed as a manipulated variable by means of feedback of the current clutch slip speed. In this embodiment, clutch slip torque $T_{SL}$ is computed based on the difference between the desired clutch slip speed (predetermined clutch slip speed, or desired amount of slip of the clutch), and the actual current clutch slip speed (measured clutch slip speed, or actual amount of slip of the clutch). The desired clutch slip speed may be set to a specific value such as 10 rpm or may be set to a value proportional to driving side rotational speed $\omega_{ENG}$. When the desired clutch slip speed is set to zero, clutch 2 is controlled so that driving engaging member 2a and driven engaging member 2b are synchronized to each other, to rotate as a unit. In this situation, the torque capacity of clutch 2 is in balance with the amount of torque input from the driving side. In this embodiment, the desired clutch slip speed is set to zero. The magnitude of clutch slip torque $T_{SL}$ is timely set as occasion arises so that actual clutch slip speed $\omega_{SL}$ computed in the equation (1) approaches zero.

Combined clutch torque setting computation part 5d serves for computing the clutch torque capacity for the transition control, and is configured to compute a combined clutch torque setting $T_{BS}$ which is constructed by combining first desired clutch torque setting $T_{ST}$ and second desired clutch torque setting $T_{IN}$ by means of a combination parameter (weighting parameter) α. Combined clutch torque setting computation part 5d includes a combination parameter setting part 5e for setting combination parameter α. Combination parameter setting part 5e gradually increases combination parameter α from zero to 1, so that combined clutch torque setting $T_{BS}$ smoothly changes from the first desired clutch torque setting $T_{ST}$ to second desired clutch torque setting $T_{IN}$. Combined clutch torque setting computation part 5d computes combined clutch torque setting $T_{BS}$ using the following equation (3).

$$T_{BS} = (1-\alpha)T_{ST} + \alpha T_{IN} \quad (3)$$

Figure 3:
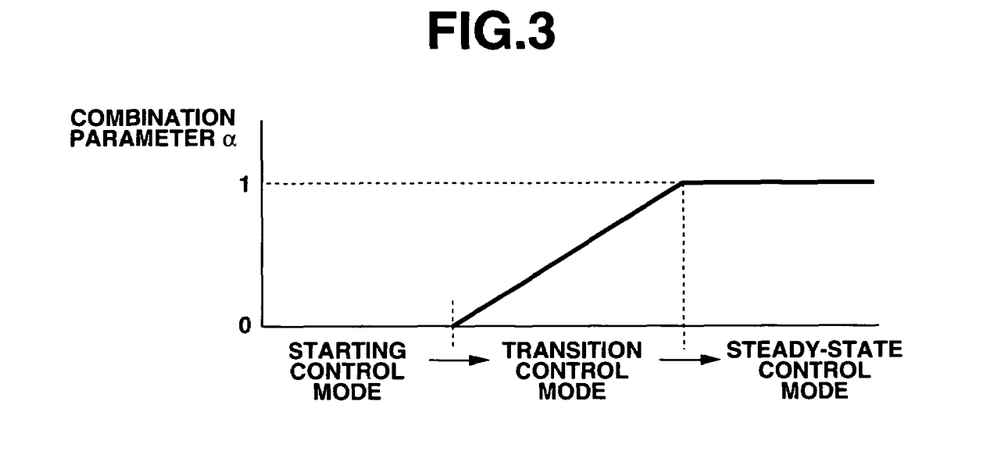
FIG. 3 is a graph showing how a combination parameter changes in a transition control mode of the clutch control apparatus of FIG. 1.

As shown in the above-mentioned equation (3), combination parameter a serves as an indicator of the weightings for first desired clutch torque setting $T_{ST}$ and second desired clutch torque setting $T_{IN}$ for computing combined clutch torque setting $T_{BS}$. With combination parameter a being zero, combined clutch torque setting $T_{BS}$ is identical to first desired clutch torque setting $T_{ST}$. With combination parameter α being 1, combined clutch torque setting $T_{BS}$ is identical to second desired clutch torque setting $T_{IN}$. The weighting for first desired clutch torque setting $T_{ST}$ increases with a decrease in combination parameter α (closer to zero), while the weighting for second desired clutch torque setting $T_{IN}$ increases with an increase in combination parameter α (closer to 1). Accordingly, when α is small, clutch 2 is controlled by a method near the starting control. When α is large, clutch 2 is controlled by a method near the steady-state control. As shown in FIG. 3, combination parameter α is set to zero in the stage of the starting control, is set to increase with time (0<α<1) in the stage of the transition control, and is fixed to 1 in the stage of the steady-state control. Thus, in this embodiment, combination parameter α is set to a value within a numerical range between zero and 1 (0≦α≦1). As discussed above, combined clutch torque setting computation part 5d computes combined clutch torque setting $T_{BS}$ by summing a first product of second desired clutch torque setting $T_{IN}$ and combination parameter a as a positive value smaller than or equal to 1, and a second product of first desired clutch torque setting TST and a value (1−α) produced by subtracting combination parameter α from 1.

In control section 6, starting control part 6a performs the starting control to control the torque capacity of clutch 2 in accordance with first desired clutch torque setting $T_{ST}$ computed by speed-ratio-based clutch torque setting computation part 5a, by adjusting the degree of engagement of clutch 2, during vehicle starting. That is, the starting control is actually carried out in starting control part 6a based on the computation of speed-ratio-based clutch torque setting computation part 5a. In this embodiment, "during vehicle starting" is defined as a condition where the vehicle starts from a stop state to a driving state where clutch slip speed $ω_{SL}$ decreases to be lower than a predetermined threshold rotational speed A (A>0). Control section 6 determines whether or not the vehicle starts to run, based on engine rotational speed Ne and throttle opening θ.

After the starting control by starting control part 6a, transition control part 6b performs the transition control to control the torque capacity of clutch 2 to change from first desired clutch torque setting $T_{ST}$ to second desired clutch torque setting $T_{IN}$ computed by torque-based clutch torque setting computation part 5b, until clutch 2 is fully engaged. In the transition control, the degree of engagement of clutch 2 is adjusted based on combined clutch torque setting $T_{BS}$ computed by combined clutch torque setting computation part 5d. Specifically, the degree of engagement of clutch 2 is adjusted so that the transmitted torque of clutch 2 is brought to be equal to the sum of clutch slip torque $T_{SL}$ computed by clutch torque setting adjustment computation part 5c, and combined clutch torque setting $T_{BS}$. With the above control, while combination parameter α is controlled by combination parameter setting part 5e to increase gradually from the state of α=0 to the state of α=1, the transmitted torque of clutch 2 is smoothly changes from first desired clutch torque setting $T_{ST}$ to the torque produced by adding second desired clutch torque setting $T_{IN}$ and clutch slip torque $T_{SL}$. Thus, the clutch control apparatus performs the starting control and the transition control seamlessly.

In this embodiment, the desired clutch slip speed is set to zero in clutch torque setting adjustment computation part 5c, so that the transmitted torque of clutch 2 changes smoothly from first desired clutch torque setting $T_{ST}$ to second desired clutch torque setting $T_{IN}$. The condition for starting the transition control is defined such that clutch slip speed $ω_{SL}$ of clutch 2 is lower than Predetermined threshold rotational speed A (A>0) computed based on at least one of throttle opening θ, vehicle speed V, rotational speed $ω_{ENG}$ of driving engaging member 2a, and rotational speed $ω_{CTH}$ of driven engaging member 2b. In the starting control, clutch 2 is controlled toward the fully engaged state (where clutch slip speed $ω_{SL}$ is zero) so that clutch slip speed $ω_{SL}$ of clutch 2 gradually decreases. Since the condition for starting the transition control is defined such that clutch slip speed $ω_{SL}$ of clutch 2 is lower than predetermined threshold rotational speed A (A>0), the transition control is reliably started before clutch 2 is fully engaged. When transition control part 6b determines that the condition of starting the transition control is satisfied, starting control part 6a terminates the starting control, and transition control part 6b subsequently starts to perform the transition control.

A period S of time for the transition control is computed based on at least one of throttle opening θ, vehicle speed V, rotational speed $ω_{ENG}$ of driving engaging member 2a, and rotational speed $ω_{CTH}$ of driven engaging member 2b. For example, transition period S is set to increase with an increase in an initial value of clutch slip speed $ω_{SL}$. After transition period S, transition control part 6b terminates the transition control. In this embodiment, combination parameter α is set to 1 by combination parameter setting part 5e after transition period S from the start of the transition control.

Steady-state control part 6c is configured to perform the steady-state control to control clutch 2 based on the magnitude of second desired clutch torque setting $T_{IN}$ after the end of the transition control by transition control part 6b. Specifically, the degree of clutch engagement is adjusted so that the transmitted torque of clutch 2 is identical to the sum of slip torque $T_{SL}$ computed by clutch torque setting adjustment computation part 5c, and second desired clutch torque setting $T_{IN}$.

When the transition control is completed by transition control part 6b, combination parameter a is equal to 1. At this moment, the magnitude of combined clutch torque setting $T_{BS}$ is equal to second desired clutch torque setting $T_{IN}$, so that the sum of slip torque $T_{SL}$ and combined clutch torque setting $T_{BS}$ in the transition control and the sum of slip torque $T_{SL}$ and second desired clutch torque setting $T_{IN}$ in the steady-state control are equal. Therefore, the transition control and the steady-state control are performed seamlessly. In starting control part 6a, transition control part 6b, and steady-state control part 6c, a torque $T_{CTH}$ to be transmitted through clutch 2 is computed using the following equation (4) in order to adjust the degree of engagement of clutch 2.

$$T_{CTH} = T_{BS} + T_{SL} \quad (4)$$
$$= (1 - a)T_{ST} + aT_{IN} + T_{SL}$$

where α=0 and $T_{SL}$=0 in the starting control (under control of starting control part 6a), 0<α<1 in the transition control (under control of transition control part 6b), and α=1 in the steady-state control (under control of steady-state control part 6c). The degree of engagement of clutch 2 is adjusted based on this computed clutch torque $T_{CTH}$.

Figure 2:
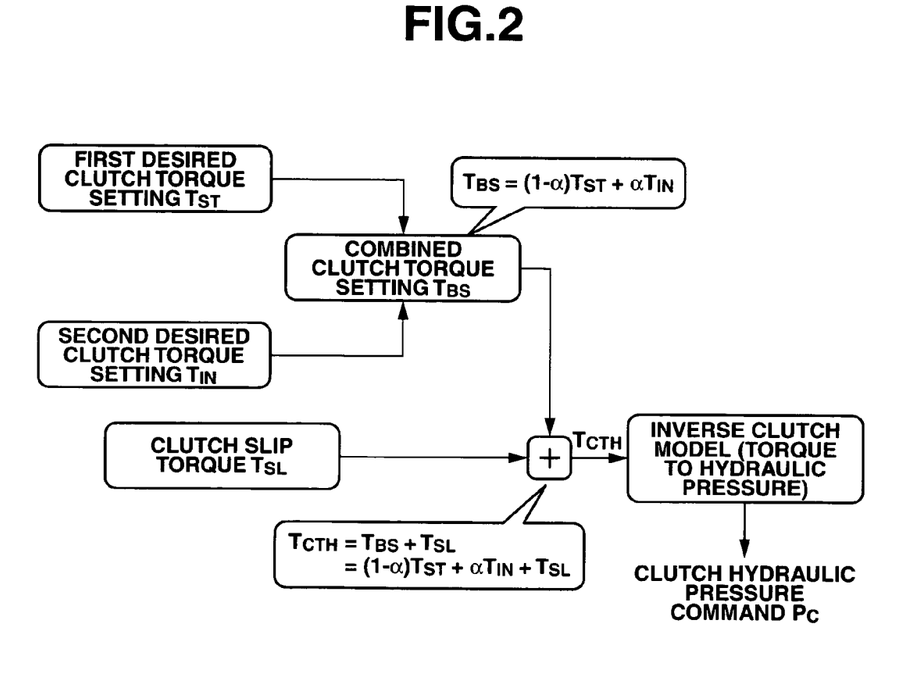
FIG. 2 is a control block diagram showing a process of computing in the clutch control apparatus of FIG. 1.

FIG. 2 is a control block diagram showing a process of computing of the equation (4). Each term in the right-hand side of equation (4), namely, torques $T_{ST}$, $T_{IN}$, and $T_{SL}$ are computed in respective parts in computation section 5. As mentioned above, first desired clutch torque setting $T_{ST}$ is computed by speed-ratio-based clutch torque setting computation part 5a, second desired clutch torque setting $T_{IN}$ is computed by torque-based clutch torque setting computation part 5b, and slip torque $T_{SL}$ is computed by clutch torque setting adjustment computation part 5c. The part of $(1-\alpha)T_{ST}+\alpha T_{IN}$ in the right-hand side of equation (4) is combined clutch torque setting $T_{BS}$, which is computed by combined clutch torque setting computation part 5d. Clutch torque $T_{CTH}$ is produced by summing combined clutch torque setting $T_{BS}$ and clutch slip torque $T_{SL}$. Starting control part 6a, transition control part 6b, and steady-state control part 6c each output a clutch hydraulic pressure command to drive clutch 2 based on clutch torque $T_{CTH}$ computed as mentioned above, to regulate the degree of engagement of clutch 2. The engagement pressure of driving engaging member 2a and driven engaging member 2b is regulated by the clutch hydraulic pressure command from each of control parts 6a, 6b, and 6c.

Figure 5:
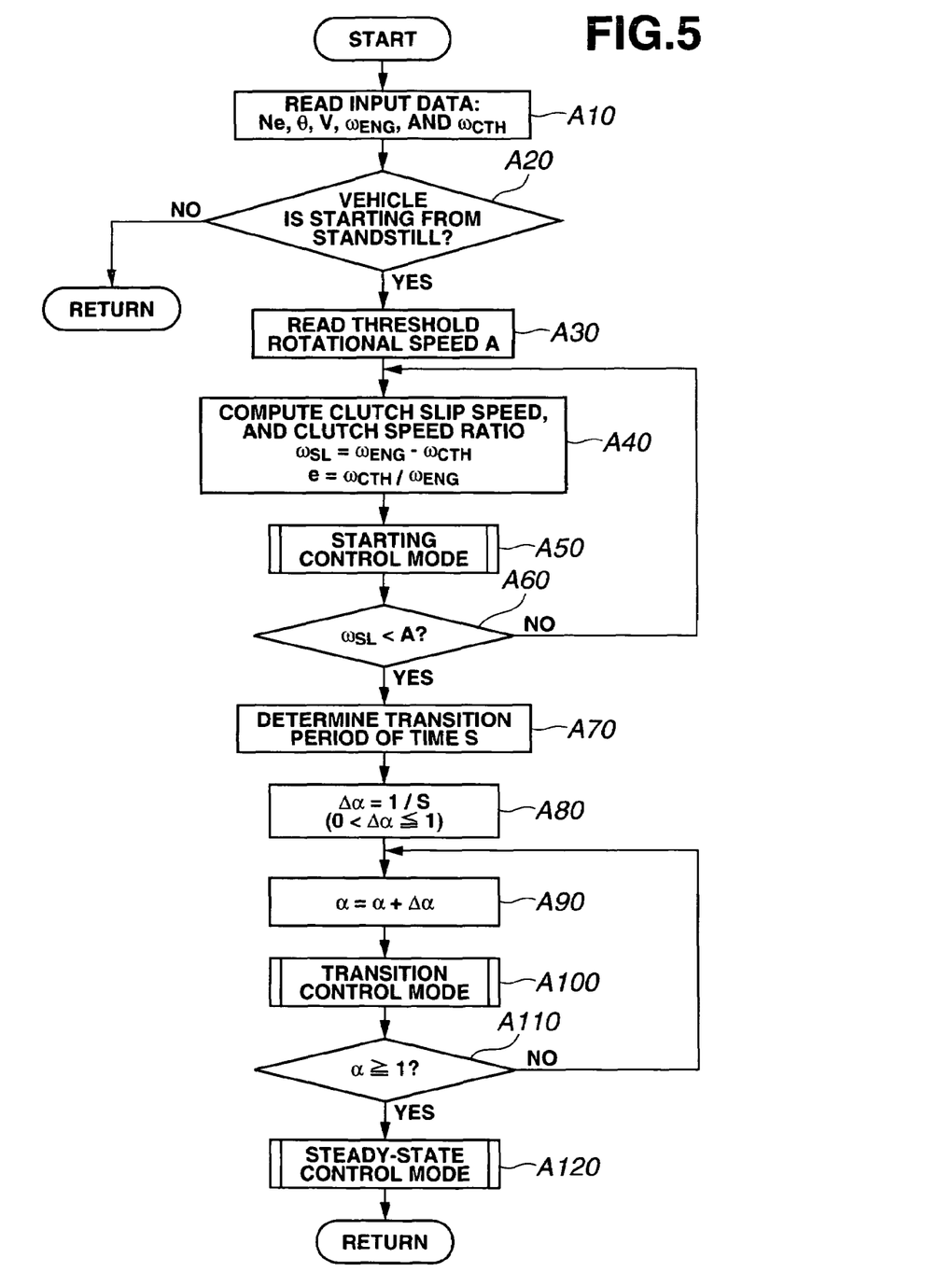
FIG. 5 is a flow chart showing a control process of the clutch control apparatus of FIG. 1.

The following describes operations performed by the clutch control apparatus of the embodiment. FIG. 5 is a flow chart showing a control process of the clutch control apparatus of the embodiment. The control process of FIG. 5 is repeatedly performed within ECU 4 at intervals of a predetermined period of time. First, at step A10, ECU 4 reads input data of parameters concerning the clutch control. Specifically, ECU 4 reads engine rotational speed Ne, throttle opening θ, vehicle speed V, and driving side rotational speed $\omega_{ENG}$ and driven side rotational speed $\omega_{CTH}$ of clutch 2. Subsequent to step A10, at step A20, ECU 4 determines whether or not the vehicle has started. Specifically, it is determined in control section 6 based on vehicle speed V and throttle opening θ whether the vehicle is at a standstill or the vehicle has started to run. When it is determined that the vehicle is started, the routine proceeds to step A30 and the subsequent steps for the starting control. On the other hand, when it is determined that the vehicle is not started yet, i.e. when it is determined that the vehicle is at a standstill, the routine returns. Thus, the starting control is carried out only after the vehicle starts to run.

At step A30, ECU 4 reads predetermined threshold rotational speed A for defining the start condition for starting the transition control. Subsequently, at step A40, ECU 4 computes clutch slip speed $\omega_{SL}$ and clutch speed ratio e of clutch 2. Subsequently, at step A50, ECU 4 performs the starting control. Specifically, at step A50, speed-ratio-based clutch torque setting computation part 5a computes clutch torque capacity coefficient $C_T$ based on clutch speed ratio e using the characteristic map as shown in FIG. 4, and computes first desired clutch torque setting $T_{ST}$ based on clutch torque capacity coefficient $C_T$ and engine rotational speed Ne. Then, starting control part 6a computes clutch torque $T_{CTH}$ to be transmitted through clutch 2 using the above-mentioned equation (4), and adjusts the degree of engagement of clutch 2 so that the transmitted torque of clutch 2 is identical to computed clutch torque $T_{CTH}$. Since clutch slip torque $T_{SL}$ is zero and combination parameter α is zero at this moment, the degree of engagement of clutch 2 is adjusted so that the transmitted torque of clutch 2 is identical to first desired clutch torque setting $T_{ST}$. Then, the control signal concerning the starting control is output to clutch 2 as a clutch hydraulic pressure command.

Subsequently, at step A60, ECU 4 determines whether or not present clutch slip speed $\omega_{SL}$ computed at step A40 is lower than predetermined threshold rotational speed A read at step A30. That is, it is determined whether or not the condition for starting the shift from the starting control to the steady-state control are satisfied. When it is determined at step A60 that $\omega_{SL} < A$ to satisfy the condition for starting the transition control, the routine proceeds to step A70 and the subsequent steps for the transition control. On the other hand, when it is determined that $\omega_{SL} \geq A$, the routine returns to step A40, so that the starting control is repeated. The condition of $\omega_{SL} \geq A$ indicates that the amount of slip of driven engaging member 2b to driving engaging member 2a is large. Accordingly, the starting control is repeated to control clutch 2 so that clutch slip speed $\omega_{SL}$ decreases gradually. When clutch slip speed $\omega_{SL}$ is brought to be lower than predetermined threshold rotational speed A by the starting control, the routine proceeds to step A70.

At step A70, ECU 4 computes transition period S in transition control part 6b. Specifically, transition period S is defined by the number of times of repeating steps A90 and A110. Subsequently, at step A80, ECU 4 sets a step Δα of combination parameter α to 1/S in combination parameter setting part 5e. For example, when transition period S computed at step A70 is 100, Δα is set to 0.01.

Subsequently, at step A90, ECU 4 increases combination parameter a by step Δα set at step A80, in transition control part 6b. Subsequently, at step A100, ECU 4 computes combined clutch torque setting $T_{BS}$ using the equation (3), and performs the transition control, in combined clutch torque setting computation part 5d. At this step A100, clutch torque setting adjustment computation part 5c computes clutch slip torque $T_{SL}$, and combined clutch torque setting computation part 5d computes combined clutch torque setting $T_{BS}$. Then transition control part 6b adjusts the degree of engagement of clutch 2 so that the transmitted torque of clutch 2 is identical to clutch torque $T_{CTH}$, i.e. the sum of clutch slip torque $T_{SL}$ computed by clutch torque setting adjustment computation part 5c, and combined clutch torque setting $T_{BS}$, and outputs the control signal concerning the starting control to clutch 2 as a clutch hydraulic pressure command.

Subsequently, at step A110, ECU 4 determines whether or not combination parameter α is larger than or equal to 1. When α<1 is determined, the routine returns to step A90, to repeat the transition control. Thus, combination parameter set part 5e gradually increases combination parameter a from zero by repeating addition of Δα at step A90. Accordingly, combined clutch torque setting $T_{BS}$ given by equation (3) smoothly changes from first desired clutch torque setting $T_{ST}$ to second desired clutch torque setting $T_{IN}$.

For example, when transition period S computed at step A70 is 100, Δα is set to 0.01. Accordingly, after addition of Δα is repeated 100 times, α reaches 1. In this embodiment, the condition for determination at step A110 is that $\alpha \geq 1$ for convenience. However, the range of α is $0 \leq \alpha \leq 1$. When α exceeds 1 as a result of adding Δα to combination parameter α at step A90, α may be considered to be set to 1. Therefore, the condition for determination at step A110 may be whether or not α=1. At step A100, ECU 4 computes a new value of combined clutch torque setting $T_{BS}$ each time α is updated with Δα. As a result, clutch torque $T_{CTH}$ as a desired state of clutch 2 is computed repeatedly S times during the transition control. Therefore, with an increase in transition period S, the number of times of computation of clutch torque $T_{CTH}$ increases so that the transition control is smoothly carried out. At the start of the transition control, the initial value of combination parameter α is zero, so that combined clutch torque setting $T_{BS}$ is identical to first desired clutch torque setting $T_{ST}$. As a result, the starting control and the transition control are connected seamlessly so as not to cause a shock due to a change in the transmitted torque. In the transition control repeated at step A100, the transmitted torque of clutch 2 changes smoothly from first desired clutch torque setting $T_{ST}$ to the torque produced by adding second desired clutch torque setting $T_{IN}$ and clutch slip torque $T_{SL}$. When α≧1 is determined at step A110, the routine proceeds to step A120, where the steady-state control is carried out. At the end of the transition control, the final value of combination parameter α is 1, so that combined clutch torque setting $T_{BS}$ is identical to second desired clutch torque setting $T_{IN}$. As a result, the transition control and the steady-state control are connected seamlessly so as not to cause a shock due to a change in the transmitted torque.

At step A120, torque-based clutch torque setting computation part 5b computes second desired clutch torque setting $T_{IN}$ in accordance with the magnitude of the engine torque input into clutch 2, and steady-state control part 6c performs the steady-state control to adjust the degree of engagement of clutch 2 so that the transmitted torque of clutch 2 is brought to be the sum of clutch slip torque $T_{SL}$ computed by clutch torque setting adjustment computation part 5c, and second desired clutch torque setting $T_{IN}$.

The following describes effects or advantages produced by the clutch control apparatus of the embodiment. The clutch control apparatus of the embodiment controls the shift from the starting control based on the clutch speed ratio to the steady-state control based on the input torque, without generating a torque shock. In addition, the clutch control apparatus performs the starting control during vehicle starting, to provide a suitable feeling of vehicle operation, while the clutch control apparatus performs the steady-state control, to enhance controllability of the clutch during vehicle steady-state driving.

In the starting control, clutch 2 is controlled in accordance with clutch slip speed $\omega_{SL}$, to reduce a torque shock due to comparatively rough accelerator operation. In the transition control, combination parameter α is set to increase gradually from zero to 1 by combination parameter setting part 5e, so that the starting control and the transition control are performed seamlessly.

The clutch control apparatus of the embodiment configured to gradually increase combination parameter α by adding Δα per cycle in the transition control as shown in the above-mentioned control process, is effective for computing combined clutch torque setting $T_{BS}$, and clutch torque $T_{CTH}$ for every cycle of adding Δα, and thereby controlling clutch 2 in a short cycle so that the clutch hydraulic pressure command to clutch 2 through control section 6 changes smoothly in the stage of the transition control.

The clutch control apparatus of the embodiment configured to start the steady-state control when combination parameter α is determined to be in the condition of α≧1 (or α=1) in the transition control, is effective for seamlessly performing a shift from the transition control to the steady-state control when combined clutch torque setting $T_{BS}$ is identical to second desired clutch torque setting $T_{IN}$.

The clutch control apparatus of the embodiment configured to control the degree of engagement of clutch 2 in the steady-state control so that the transmitted torque of clutch 2 is identical to the sum of clutch slip torque $T_{SL}$ and second desired clutch torque setting $T_{IN}$, is effective for holding a state of clutch 2 where a desired amount of slip of clutch 2 is constantly produced with respect to input engine rotational speed $\omega_{ENG}$ during vehicle steady-state driving.

The clutch control apparatus of the embodiment configured to control clutch 2 to be in a state where the torque capacity of clutch 2 is in balance with a torque input from the driving side, namely, a steady-state condition where clutch slip speed $\omega_{SL}$ is zero and the amount of torque input to clutch 2 is equal to the amount of torque actually transmitted through clutch 2, is effective for holding a slip state infinitely near an engaged state without generating a static frictional force between the driving and driven sides, to improve the clutch controllability.

In the clutch control apparatus of the embodiment, the state where clutch 2 is not fully engaged is detected easily based on clutch slip speed $\omega_{SL}$ of clutch 2. The clutch control apparatus of the embodiment configured to set the condition for starting a shift from the starting control to the steady-state control and transition control period S based on at least one of throttle opening θ, vehicle speed V, rotational speed $\omega_{ENG}$ of driving engaging member 2a, and rotational speed $\omega_{CTH}$ of driven engaging member 2b, is effective for starting and performing the transition control at appropriate timings. The adjustment of transition period S changes smoothness or quickness of the transition control. When transition period S is set to be long, the rate of change in the transmitted torque in the transition stage is reduced. On the other hand, when transition period S is set to be short, the transition is quickly completed.

Since the common equation (4) is used in the computation of the clutch torque in starting control part 6a, transition control part 6b, and steady-state control part 6c, the degree of engagement of clutch 2 is easily controlled. In the conventional clutch control, it is difficult to directly compute the clutch hydraulic pressure command of a clutch based on the difference between a desired slip speed and an actual slip speed, since the clutch is controlled based on the clutch speed ratio. On the other hand, in the clutch control apparatus of the embodiment, the equation of motion of clutch 2 can be easily constructed using the inertia and the rotational speed of each of driving engaging member 2a and driven engaging member 2b of clutch 2, to simplify the computation, since clutch 2 is controlled based on the input torque.

The clutch control apparatus of the embodiment including control section 6 configured to compute the clutch hydraulic pressure command for driving clutch 2 based on clutch torque $T_{CTH}$ using an inverse clutch model, and to control the degree of engagement of clutch 2, is effective for determining the degree of engagement of clutch 2 required to generate the computed transmitted torque, to control the hydraulic pressure of clutch 2 appropriately.

The clutch control apparatus of the embodiment configured to hold clutch slip speed $\omega_{SL}$ between the driving and driven sides of clutch 2 at zero in the steady-state control, where no static frictional force occurs between the driving and driven sides of clutch 2, is effective for enhancing the clutch controllability, without adversely affecting the efficiency of torque transmission. In other words, a dynamic frictional force is constantly applied between the driving and driven sides of clutch 2, so that it is possible to produce a desired amount of slip in clutch 2 with a sufficient response, to control clutch 2 more correctly as desired.

The following describes modifications to the shown embodiment. Although the desired slip speed is set to zero in the computation of clutch slip torque $T_{SL}$ in clutch torque setting adjustment computation part 5c, the desired slip speed may be alternatively set to a value such as 10 rpm, or may be set to be proportional to driving side rotational speed $\omega_{ENG}$ (for example, 1% of the driving side rotational speed). In accordance with this computed desired clutch slip speed, the magnitude of clutch slip torque $T_{SL}$ is computed in clutch torque setting adjustment computation part 5c and used to determine the magnitude of clutch torque $T_{CTH}$ as a desired state of clutch 2. In general, when an equation of motion is constructed based on the movement state of clutch 2, torques transmitted between engaging members 2a and 2b are applicable of addition and subtraction on computation. Therefore, the above computations, i.e., the clutch torque in consideration of the clutch slip torque is computed easily and correctly.

Since clutch slip torque $T_{SL}$ computed by clutch torque setting adjustment computation part 5c is applied to clutch 2 to generate a slip in clutch 2 in the transition stage to the stage of the steady-state control, robustness of the steady-state control in the transition stage is secured. Similarly, since clutch slip torque $T_{SL}$ is applied to clutch 2 to generate a slip in clutch 2 in the steady-state control, the robustness of the steady-state control is secured with preventing full engagement of clutch 2.

Although the magnitude of first desired clutch torque setting $T_{ST}$ is computed based on the clutch speed ratio between the driving and driven sides of clutch 2 in speed-ratio-based clutch torque setting computation part 5a in the above-mentioned embodiment, it is optional to compute first desired clutch torque setting $T_{ST}$ based on the clutch slip speed between the driving and driven sides of clutch 2. For example, the clutch speed ratio may be computed based on the actual rotational speed of one of the driving and driven sides in addition to the clutch slip speed.

This application is based on a prior Japanese Patent Application No. 2005-066110 filed on Mar. 9, 2005, and a prior Japanese Patent Application No. 2005-164568 filed on Jun. 3, 2005. The entire contents of these Japanese Patent Applications Nos. 2005-066110 and 2005-164568 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A clutch control apparatus for a power transmission system including an input rotating member and an output rotating member, the clutch control apparatus comprising:
    a friction clutch adapted to couple the input rotating member and the output rotating member with a variable degree of engagement, to transmit a clutch torque from the input rotating member to the output rotating member;
    a clutch actuator arranged to regulate the degree of engagement of the friction clutch to control the clutch torque; and
    a control unit connected for signal communication to the clutch actuator, and configured to perform the following:
        setting a first desired clutch torque setting in accordance with a clutch slip indicator indicative of an amount of slip between the input rotating member and the output rotating member;
        setting a second desired clutch torque setting to an amount of torque input from the input rotating member to the friction clutch;
        controlling the clutch torque to be the first desired clutch torque setting during a starting stage of the friction clutch;
        controlling the clutch torque to be the second desired clutch torque setting during a steady-state stage of the friction clutch; and
        controlling the clutch torque to gradually change from the first desired clutch torque setting to the second desired clutch torque setting during a transition stage between the starting stage and the steady-state stage.

2. The clutch control apparatus as claimed in claim 1, wherein the input rotating member is connected to an engine of an automotive vehicle.

3. The clutch control apparatus as claimed in claim 2, wherein the control unit is configured to perform the following:
    determining a threshold rotational speed in accordance with at least one of a throttle opening of the vehicle, a vehicle speed of the vehicle, a rotational speed of the input rotating member, and a rotational speed of the output rotating member; and
    entering the transition stage when a clutch slip speed defined as a difference in rotational speed between the input rotating member and the output rotating member decreases to be lower than the threshold rotational speed.

4. The clutch control apparatus as claimed in claim 2, wherein the control unit is configured to set a period of time for the transition stage in accordance with at least one of a throttle opening of the vehicle, a vehicle speed of the vehicle, a rotational speed of the input rotating member, and a rotational speed of the output rotating member.

5. The clutch control apparatus as claimed in claim 1, wherein the control unit is configured to perform the following:
    changing a combination parameter from zero to 1 gradually with time during the transition stage;
    setting a combined clutch torque setting by using the following equation, $$T_{BS} = (1-\alpha) \cdot T_{ST} + \alpha \cdot T_{IN}$$

where
    $T_{BS}$ is the combined clutch torque setting,
    $T_{ST}$ is the first desired clutch torque setting,
    $T_{IN}$ is the second desired clutch torque setting, and
    $\alpha$ is the combination parameter; and
    controlling the clutch torque in accordance with the combined clutch torque setting during the transition stage.

6. The clutch control apparatus as claimed in claim 5, wherein the control unit is configured to enter the steady-state stage when the combination parameter reaches 1.

7. The clutch control apparatus as claimed in claim 5, wherein the control unit is configured to perform the following:
    setting a clutch torque adjustment for producing a clutch slip speed defined as a difference in rotational speed between the input rotating member and the output rotating member, to regulate the clutch slip speed to a desired value; and
    controlling the clutch torque in accordance with the combined clutch torque setting and the clutch torque adjustment during the transition stage.

8. The clutch control apparatus as claimed in claim 7, wherein the control unit is configured to control the clutch torque in accordance with the second desired clutch torque setting and the clutch torque adjustment during the steady-state stage.

9. The clutch control apparatus as claimed in claim 7, wherein the control unit is configured to control the clutch torque in accordance with a sum of the combined clutch torque setting and the clutch torque adjustment during the transition stage.

10. The clutch control apparatus as claimed in claim 7, wherein the control unit is configured to set the clutch torque adjustment in accordance with a difference between the desired value of the clutch slip speed and an actual value of the clutch slip speed.

11. The clutch control apparatus as claimed in claim 1, wherein the friction clutch is a wet multiplate clutch, wherein the clutch actuator is arranged to generate a clutch engagement pressure of the friction clutch to control the clutch torque, and wherein the control unit is configured to output a clutch hydraulic pressure command to the clutch actuator to regulate the clutch engagement pressure.

12. A clutch control apparatus for a power transmission system including an input rotating member and an output rotating member, the clutch control apparatus comprising:
    friction means for coupling the input rotating member and the output rotating member with a variable degree of engagement, to transmit a clutch torque from the input rotating member to the output rotating member;
    actuating means for regulating the degree of engagement of the friction means to control the clutch torque; and
    control-means for performing the following:
        setting a first desired clutch torque setting in accordance with a clutch slip indicator indicative of an amount of slip between the input rotating member and the output rotating member;
        setting a second desired clutch torque setting to an amount of torque input from the input rotating member to the friction means;
        controlling the clutch torque to be the first desired clutch torque setting during a starting stage of the friction means;
        controlling the clutch torque to be the second desired clutch torque setting during a steady-state stage of the friction means; and
        controlling the clutch torque to gradually change from the first desired clutch torque setting to the second desired clutch torque setting during a transition stage between the starting stage and the steady-state stage.

13. A clutch control method of controlling a power transmission system including an input rotating member, an output rotating member, a friction clutch adapted to couple the input rotating member and the output rotating member with a variable degree of engagement, to transmit a clutch torque from the input rotating member to the output rotating member, and a clutch actuator arranged to regulate the degree of engagement of the friction clutch to control the clutch torque, the clutch control method comprising:
    setting a first desired clutch torque setting in accordance with a clutch slip indicator indicative of an amount of slip between the input rotating member and the output rotating member;
    setting a second desired clutch torque setting to an amount of torque input from the input rotating member to the friction clutch;
    controlling the clutch torque to be the first desired clutch torque setting during a starting stage of the friction clutch;
    controlling the clutch torque to be the second desired clutch torque setting during a steady-state stage of the friction clutch; and
    controlling the clutch torque to gradually change from the first desired clutch torque setting to the second desired clutch torque setting during a transition stage between the starting stage and the steady-state stage.

* * * * *